Sept. 29, 1942.   R. S. SANFORD ET AL   2,297,026
GEAR SHIFTING MECHANISM
Filed April 20, 1939   4 Sheets-Sheet 3

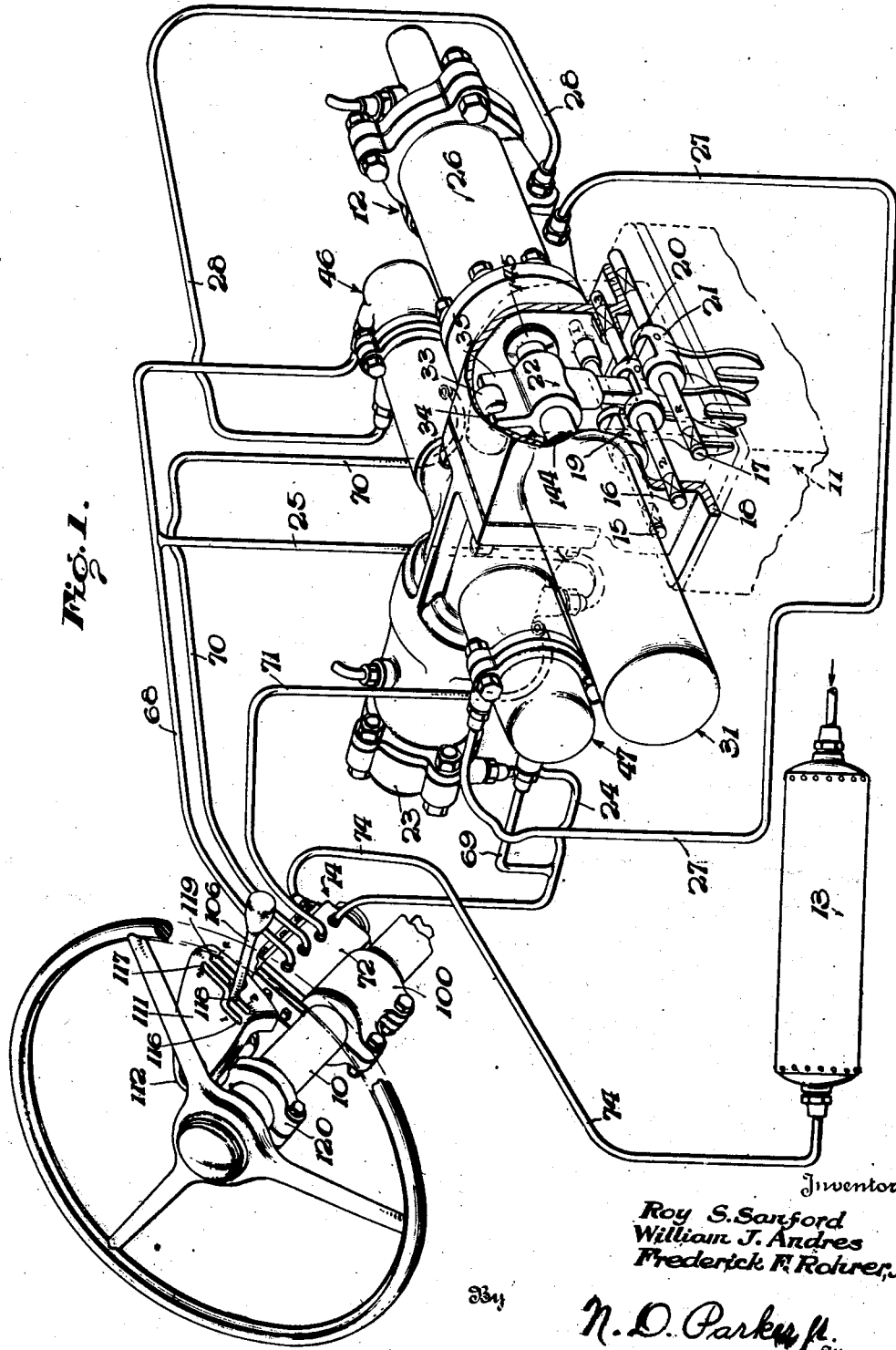

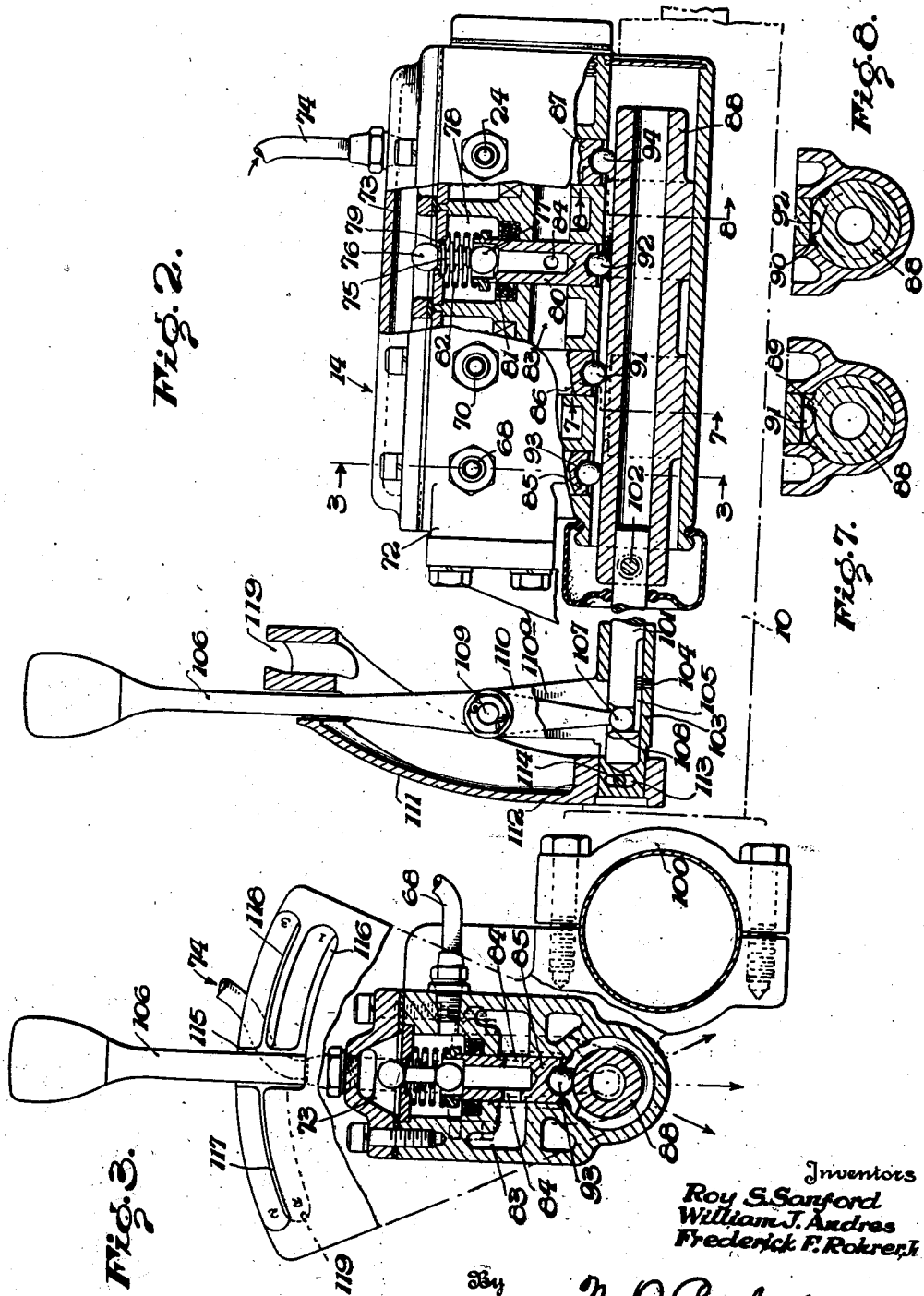

Inventors
Roy S. Sanford
William J. Andres
Frederick F. Rohrer, Jr.

N. D. Parker Jr.
Attorney

Sept. 29, 1942.   R. S. SANFORD ET AL   2,297,026
GEAR SHIFTING MECHANISM
Filed April 20, 1939   4 Sheets-Sheet 4
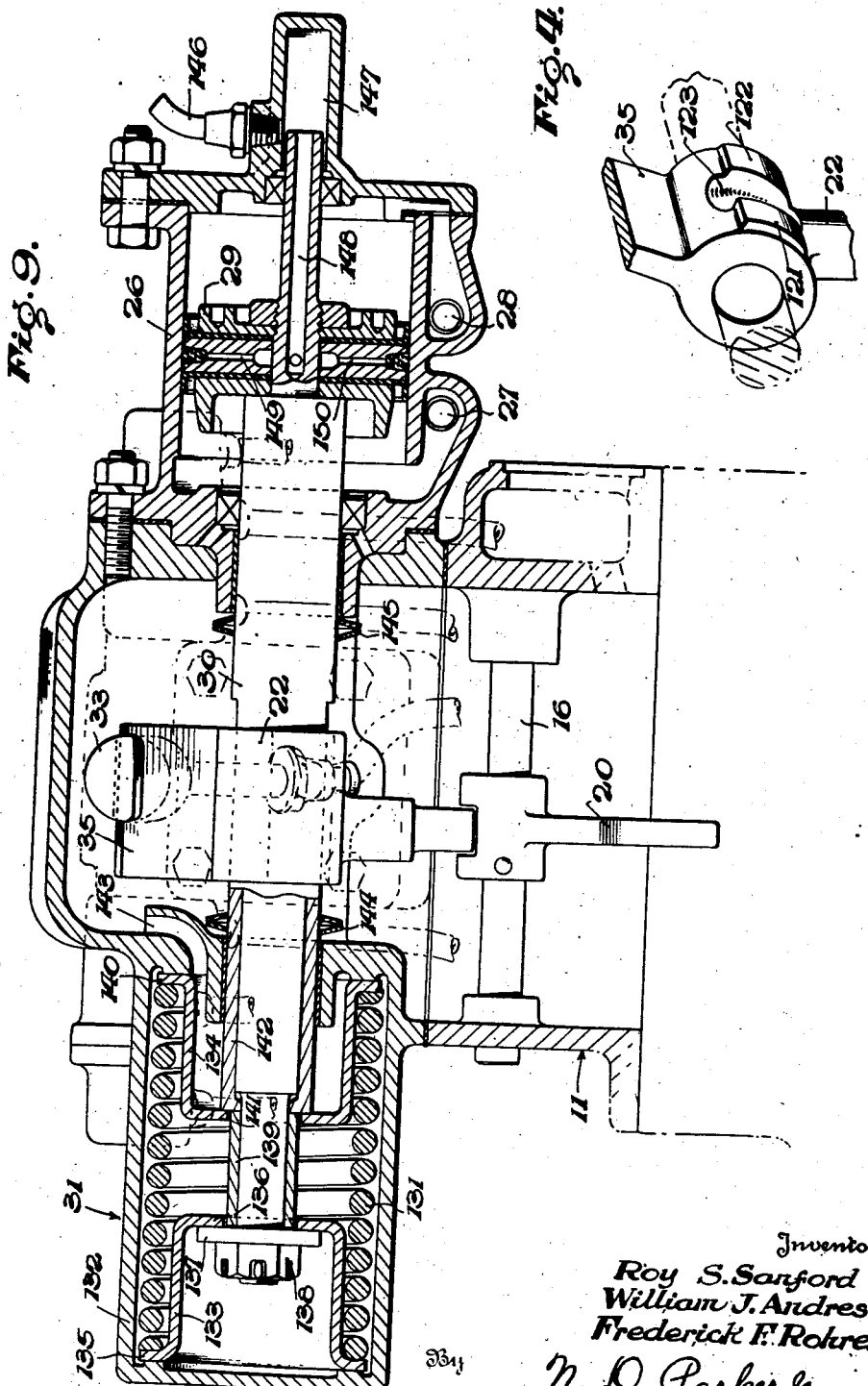
Inventors
Roy S. Sanford
William J. Andres
Frederick F. Rohrer, Jr.
N. D. Parker Jr.
Attorney Patented Sept. 29, 1942

2,297,026

UNITED STATES PATENT OFFICE 2,297,026

GEAR SHIFTING MECHANISM

Roy S. Sanford, William J. Andres, and Frederick F. Rohrer, Jr., Pittsburgh, Pa., assignors to Bendix-Westinghouse Automotive Air Brake Company, Pittsburgh, Pa., a corporation of Delaware Application April 20, 1939, Serial No. 268,982

9 Claims. (Cl. 74—346)

This invention relates to gear-shifting mechanism and more particularly to a power-operated control apparatus for effecting the various gear-changing operations of a motor vehicle transmission.

One of the objects of the present invention is to provide a novel power-operated motor vehicle transmission capable of being remotely controlled in an efficient manner.

Another object is to provide a remotely-controllable power-operated mechanism for effecting the various shifts of a transmission of the type having a plurality of shift bars movable in opposite directions to establish various gear relations.

A further object is to provide, in a mechanism of the above character, a novel arrangement for insuring proper operation of the power devices in the selection and shifting of desired transmission members.

A still further object includes the provision of a novel interlocking mechanism in order to prevent power operation of a transmission shift bar until all bars are in neutral position, such feature thereby materially constributing to the safety aspects of the system.

Still another object comprehends the simplification of the manually-operable control unit in such a manner as to render it readily accessible to the operator and capable of operation in a manner simulating the movement of the conventional manually-operable gear shift lever.

Other objects and novel features of the invention will appear more fully hereinafter from a consideration of the following detailed description when taken in connection with the accompanying drawings, wherein one embodiment of the invention is illustrated. It is to be expressly understood, however, that the drawings are not designed as a definition of the limits of the invention, reference being had to the appended claims for this purpose.

In the drawings, wherein similar reference characters refer to like parts throughout the several views:

Fig. 1 is a perspective view, partly in section, of a gear-shifting mechanism constructed in accordance with the principles of the present invention;

Fig. 2 is a side view of the control valve mechanism, certain of the parts being shown in section;

Fig. 3 is a front view, partly in section, of the mechanism of Fig. 2;

Fig. 4 is a partial view in perspective of the cam carried by the shifter piston rod;

Figure 6:
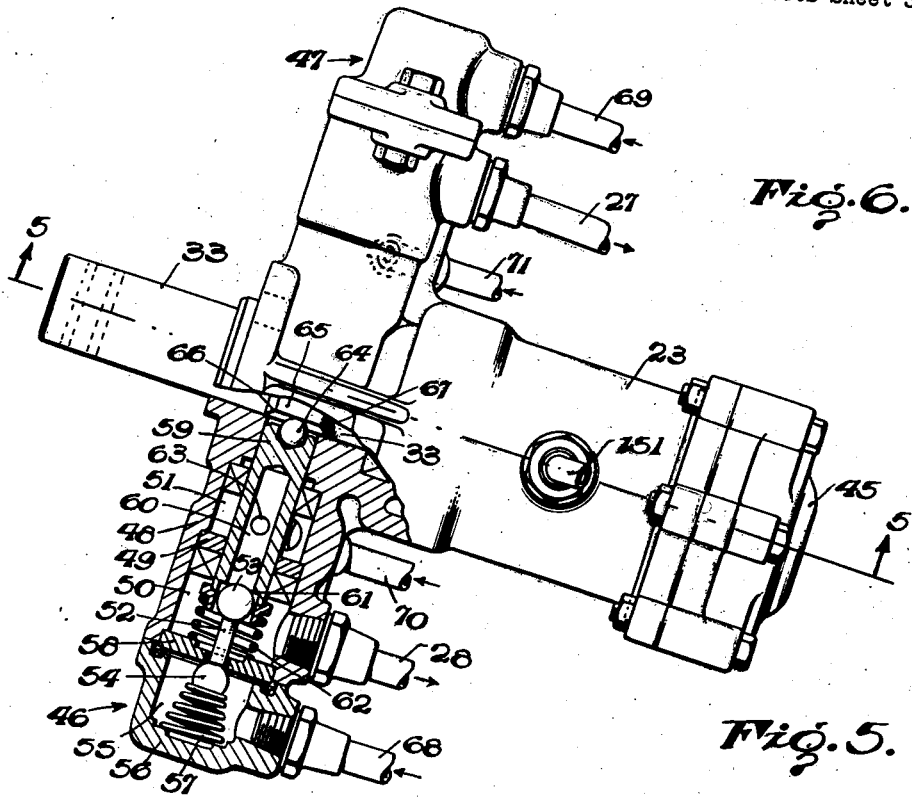
Fig. 6 is a plan view, partly in section, of the selector motor and valves controlled thereby.

Figs. 7 and 8 are partial views in section taken along lines 7—7 and 8—8 of Fig. 2, and Fig. 9 is an axial sectional view of the shifter motor.

Referring more particularly to Fig. 1, the present invention is illustrated therein in connection with an automotive vehicle having a steering column 10 and a gear-changing transmission 11. The latter has associated therewith a fluid pressure-operated gear-shifting apparatus 12 adapted to be supplied with fluid pressure from a reservoir 13, a remotely-positioned manually-operable control valve mechanism 14 being operably positioned adjacent the operator, as for example being mounted upon the steering column, in order that the flow of fluid pressure from the reservoir to the power-operated gear-shifting apparatus may be conveniently controlled.

The ratio-changing transmission 11 is of the general type utilizing a plurality of reciprocable shift bars for effecting the desired gear ratio. As illustrated, three shift bars 15, 16 and 17 are slidably mounted in the transmission housing 18 and respectively carry shift forks 19, 20 and 21 which are adapted to establish the desired gear ratios when reciprocated by the shift bars. The shift bars 15, 16 and 17 are preferably so arranged with respect to the ratio-changing transmission 11 that, referring to Fig. 1, movement of bar 15 to the right is effective to establish first gear relation, movements of the bar 16 to the left and right are effective to respectively establish second and third gear relations, while movement of the bar 17 to the left serves to establish reverse gear relation. It will be understood, however, that the power-operated control mechanism, though particularly illustrated and described below for securing the above movements of the shift rods, may be adapted for moving the bars in other relations which may be necessary in other types of transmissions.

In order to select a desired shifter bar for subsequent shifting to effect the desired gear ratio, a combined selector and shifter finger 22 is adapted to cooperate with the shifter forks, the said finger being oscillatable to effect the aforesaid selecting movement by means of a fluid motor 23 to which fluid pressure is admitted through conduits 24 and 25. The subsequent shifting of the finger 22 and the selected shift rail engaged thereby is accomplished by a shifting motor 26, the latter being supplied with fluid pressure through conduits 27 and 28. Shifting motor 26 includes a piston 29, see Fig. 9, having a piston rod 30 to which the finger 22 is secured. Preferably, the piston rod 30 is extended and its outer extremity has associated therewith a neutralizing or centering mechanism 31 for normally maintaining the finger 22 in central or neutral position when fluid pressure is exhausted from the shifter motor.

Figure 5:
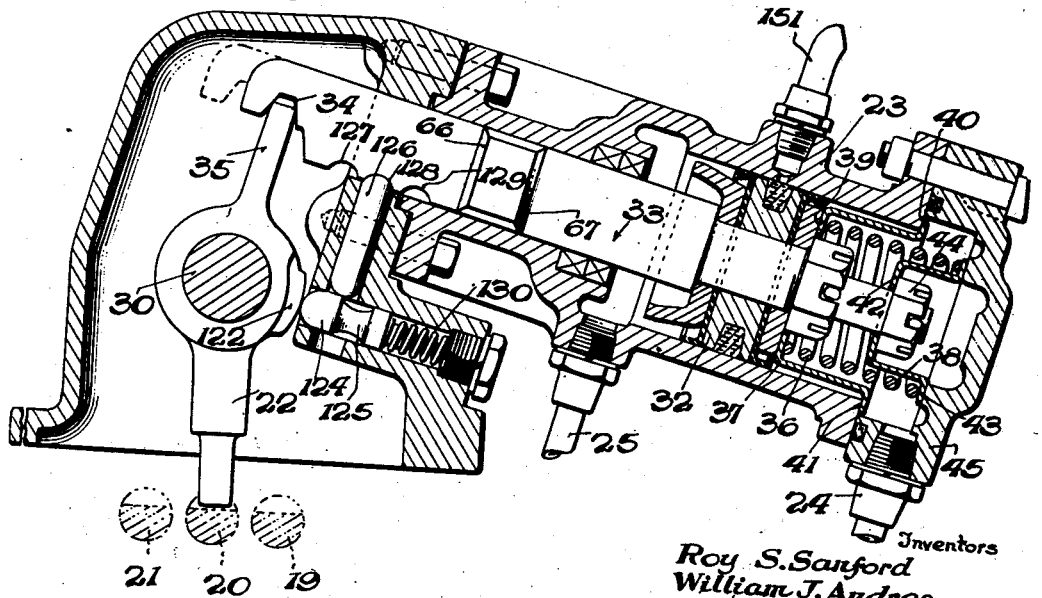
Fig. 5 is an axial sectional view of the selector motor and a portion of the transmission.

As illustrated more particularly in Fig. 5, the fluid motor 23 for effecting selecting movement of the finger 22 includes a piston 32 having a piston rod 33, the outer end of which is formed with a notch 34 for receiving an upstanding flanged portion 35 of the finger 22. As will be readily understood from this figure, movement of the piston 32 in opposite directions will effect oscillating movement of the finger 22 about the piston rod 30 of the shifter piston 29. The selector piston 32 is preferably normally maintained in the central or neutral position as shown, by means of a double-acting centering spring 36, the latter being confined between cups 37 and 38. Cup 37 is provided with a pair of flanged portions 39 and 40 bearing respectively upon the piston 32 and against an abutment 41 of the motor 23, while cup 38 has a pair of oppositely-flanged extensions 42 and 43 which respectively bear against a nut 44 carried by the right-hand extremity of piston rod 33 and a cap 45 of the motor 23. In assembling the spring 36 between the cups 37 and 38, the spring is initially preloaded a slight degree, and, from this construction, it will be readily understood that, upon release of fluid pressure from both sides of the piston 32, the spring 36 will serve to move the piston to the central neutral position shown where the finger 22 is operatively associated with the center shift bar 16. Thus, the combined selector and shifter finger is normally in engagement with the shifter fork 20 and the latter may be moved to the left and the right, as viewed in Fig. 1, in order to establish the second or third gear relation merely by energizing the shifter motor in one or the other direction. However, in the event that it is desired to select either of the shift bars 15 or 17, fluid pressure is admitted through the conduits 24 or 25 in order to effect movement of the selector piston 32 to the left or right, as viewed in Fig. 5. Release of fluid pressure from the selector and shifter motors will enable the neutralizing elements associated therewith to function in order to return the shifter finger to the position illustrated in Fig. 1.

As set forth above, in order to establish first gear relation, shift bar 15 must be moved to the right, as viewed in Fig. 1. Prior to this shifting movement of the bar 15, the selector finger 22 must be moved by the selector motor in order that the finger 22 engage the shifter fork 19 carried by bar 15. It is highly desirable, in a remotely-controlled fluid pressure-operated gear-shifting mechanism of the character described herein, to interlock the operation of the selector and shifter motor in such a manner as to enable sequential operation of these devices. In other words, the application of fluid pressure to the shifter motor to shift the bar 15, for example, should be delayed until after finger 22 has been moved to select this bar. In order to secure this very desirable result, means are provided for controlling the flow of fluid pressure to the shift motor 26 dependent upon operation of the selector motor 23. Since the shifter bar 17 utilized for securing reverse gear relation in the present invention must also be selected prior to shifting, the aforementioned means is also so constituted as to delay the application of fluid pressure to the shifting motor 26 until after such movement of selector 23 has occurred that the finger 22 has selected the bar 17.

The means for accomplishing the foregoing results are constituted by a pair of similar valve devices 46 and 47, see Figs. 1 and 6. Since these valve devices are identical in construction, the constituent parts of one only will be described in detail. As will appear more fully from a consideration of Fig. 6, the valve 46 includes a casing 48 having a partition 49 therein dividing the casing into outlet and exhaust chambers 50 and 51 respectively. A valve member 52 includes an exhaust head 53 and an intake head 54, the former being positioned within the outlet chamber and the latter being located within an inlet chamber 55 formed by a cap 56. The valve 52 is normally maintained in the position illustrated in Fig. 6 by means of a spring 57 engaging head 54 and urging the valve to a seat formed in a partition 58. This results in the interruption of communication between intake chamber 55 and outlet chamber 50. A valve-operating member 59 is slidably mounted within casing 48 and is provided with a bore 60, the open end of which forms an exhaust valve seat 61. Resilient means, such as spring 62, is confined between partition 58 and one end of the valve-operating member 59 and serves to normally move the exhaust valve seat 61 away from head 53, thus connecting the outlet chamber 50 with the exhaust chamber 51 through an opening 63 located in the wall of member 59. The opposite end of the latter is engaged by a suitable cam 64 which is normally engaged with a reduced portion 65 of the selector piston rod 33. On either side of the portion 65, the piston rod 33 is provided with cams 66 and 67, it being pointed out that, upon movement of the piston rod 33 in opposite directions, these cams are effective through their co-operation with cam 64 to move the valve-operating member 59 in such a manner as to close the exhaust head 53 and open the intake head 54, thus interrupting communication between chambers 50 and 51 and establishing communication between chambers 50 and 55. The latter chamber is adapted to be supplied with fluid pressure through a conduit 68, and, when the above mentioned communication between chambers 50 and 55 is established such fluid pressure is conducted to conduit 28 which connects the right-hand portion of shifter motor 26 with the source of fluid pressure.

Since the valve device 47 is similar in every respect to the valve 46 described in detail above, it will be understood that, upon movement of piston 33 and consequent operation of valve 47 by cams 66 or 67, conduits 69 and 27 will be interconnected, and, since the latter communicates with the left-hand portion of shifter motor 26, as viewed in Fig. 9, fluid pressure will be conducted to this side of the motor in the event that conduit 69 is connected with the source of fluid pressure.

The valve devices 46 and 47 are further so arranged that, when the selector motor 23 is deenergized, such valves are in a position to conduct fluid pressure to one side or the other of the shifter motor 26 in accordance with the operation of the remotely controlled valvular mechanism 14. In this way, the shifter motor 26 may be energized in opposite directions in order to effect an establishment of the second or third gear relation through movement of the shifter bar 16. Referring to Fig. 6, with the parts in the position therein shown, it will be perceived that conduit 28 is connected with a conduit 70 past the open valve head 53, bore 60 and port 63. In like manner, conduit 27 connected with valve device 47 communicates with a conduit 71. Conduits 70 and 71 are adapted to be connected with the fluid pressure source 13 through operation of the valvular mechanism 14, and thus, when it is desired to establish second or third gear relation, it is only necessary to charge either conduit 70 or conduit 71 whereupon the valve device 46 or 47 will be effective to conduct the fluid pressure to one or the other side of the shifter motor 26. However, if first gear relation is desired, conduit 24 is connected with the supply of fluid pressure through suitable operation of the valvular mechanism 14. As will be observed from Fig. 5, fluid pressure is thereupon conducted to the right-hand portion of the selector motor 23 and the piston 32 of the latter is thereupon moved to the left in order to oscillate the finger 22 to a position to engage shifter fork 19 on shift bar 15. As will be understood from Fig. 6, at about the time the selector piston rod 33 has moved to a position such that the finger 22 has engaged the fork 19, cam 67 will move the valve-operating element of the valve device 47 in order to establish communication between conduits 69 and 27. Since the former is connected with conduit 24, see Fig. 1, and is thus supplied with fluid pressure, such pressure will be conducted through conduit 27 to the left-hand end of the shifter motor 26. The piston of the latter, together with the finger 22 secured thereto, will thereupon be moved to the right, as viewed in Figs. 1 and 9, and thus the first gear relation will be established. In this connection, it will be observed that only one conduit, namely 24, need be connected with the source of fluid pressure, the interlocking arrangement between the operation of the selector motor and shifter motor enabling proper sequential action of these elements.

It will be observed, moreover, that the same sequential action is inherent in the apparatus of the present invention in establishing reverse gear relation. For example, in this operation, it is only necessary to charge conduit 68 with fluid pressure. Since conduit 25, leading to the left-hand portion of selector motor 23, see Fig. 5, is connected with conduit 68, Fig. 1, piston 32 of the selector motor will be moved to the right and the finger 22 will be engaged with the shifter fork 21 on shifter bar 17. As soon as this has occurred, cam 66 on the piston rod 33, through cooperation with cam 64, will serve to operate valve 52, thus establishing communication between conduit 68, charged with fluid pressure, and conduit 28, leading to the right-hand portion of shifter motor 26, Fig. 9. Piston 29 of the latter will thereupon be moved to the left in order to secure reverse gear ratio.

In order to control the communication between conduits 24, 68, 70 and 71 and the source of fluid pressure 13, the valvular mechanism 14 is provided. Referring to Figs. 2 and 3, such valvular mechanism includes a casing 72 housing a plurality of valves, one for each of the four above mentioned conduits. The casing 72 is provided with an inlet chamber 73 common to each of the valves and such chamber communicates with the fluid pressure source 13 through any suitable means, such as a conduit 74. Since each of the aforementioned valves is similar in construction, one only will be described in detail.

As will be observed from Fig. 2, the casing 72 has been broken away in order to illustrate in section the valve for controlling fluid pressure flow through conduit 71. Therein, it will be seen that a valve 75 is provided with an intake head 76 positioned in the common inlet chamber 73 and an exhaust head 77 located within an outlet chamber 78. The latter chamber is connected with conduit 71 through a suitable opening positioned in the side of the casing 72. Normally, a spring 79 maintains the valve 75 in the position shown, wherein valve head 76 closes communication between chambers 73 and 78. In this position of the parts, a valve-operating member 80, provided at its upper end with an exhaust valve seat 81, is urged downwardly by a spring 82, thus connecting, through openings 84, the outlet chamber 78 with an exhaust chamber 83, common to all of the valves. Thus, in the inoperative position of valve 75, the outlet chamber 78 connected with conduit 71 communicates with the atmospheric exhaust through openings 84. As heretofore stated, the remaining valves of the valve mechanism 14 are identical with the valve 75, and, for the sake of clarity in the following description, it will be here noted that the valve, controlling conduit 68, is provided with an operating member 85, the valve, controlling conduit 70, is operated by a member 86, while the valve-operating member for the valve, controlling conduit 24, is indicated at 87.

In order to selectively operate the valves in the housing 72, there is provided by the present invention an operating rod or member 88 which is mounted at the bottom of casing 72 in such a manner as to be capable of longitudinal and rotatable movement with respect thereto. This valve-operating member has formed thereon a pair of cams 89 and 90 for selectively operating the various valve-operating members 80, 85, 86 and 87 depending upon the longitudinal position of the rod 88 with respect to such members and dependent also upon the direction of rotation of the member 88. As will be observed from Figs. 7 and 8, the valve-operating rod 88 is normally so positioned that the cams 89 and 90 are in contact with balls 91 and 92 which are respectively associated with the valve-operating members 86 and 80. Thus, counterclockwise movement of rod 88, as viewed in Fig. 7, will, through cooperation of cam 89 and ball 91, move the valve-operating member 86 upwardly in order to connect the intake chamber 73 with conduit 70. On the other hand, as viewed in Fig. 8, clockwise movement of rod 88 will operate valve 75 through cooperation between cam 90 and ball 92. Movement of valve 75 upwardly will serve to connect the intake chamber 73 with conduit 71. As will be observed from Fig. 2, the cam surfaces 89 and 90 are of such longitudinal extent as to be capable of operating only the balls 91 or 92 as the rod 88 is rotated in one direction or the other as the latter occupies the longitudinal position shown. However, if the rod 88 is moved to the left, as viewed in Fig. 2, cam 89 will be brought out of cooperative relation with respect to ball 91 and brought into cooperation with the ball 93 associated with the valve-operating member 85. Thereupon, if the rod 88 is moved in a counterclockwise direction, as viewed in Fig. 7, the valve controlled by the valve-operating member 85 will be opened in order to conduct fluid pressure to conduit 68. On the other hand, if it is desired to operate the valve controlled by valve-operating member 87, the rod 88 is moved to the right, as viewed in Fig. 2, a sufficient distance to bring cam 90 into cooperative relation with ball 94. Thereupon, rod 88 is moved counterclockwise, as viewed in Fig. 8, and the valve controlled by movement of the valve-operating member 87 is moved to open position and connects conduit 24 with the source of fluid pressure through intake chamber 73 and conduit 74. As illustrated in Figs. 1 and 3, a suitable bracket 100 is secured to the casing 72 of the valve mechanism 14 in order to provide a support for the latter.

For the purpose of controlling the rotatable and longitudinal movements of the valve-actuating rod 88, a member 101 is secured to one end of the rod, as by means of a pin 102, and is extended outwardly of the rod 88 to a position conveniently accessible to the operator. A sleeve 103 surrounds member 101 and is so constructed as to be capable of rotating the latter. This action is achieved through the provision of a pin 104 located in the side wall of the sleeve and extending into a longitudinally-extending slot or keyway 105 positioned in member 101. This construction also enables the member 101 to be moved axially with respect to the sleeve 103 in order to effect the above mentioned selecting movement of the valve-actuating rod 88.

In order to control the axial movement of member 101 and the rotatable movement of the sleeve 103, a manually-operable control lever 106 is operatively connected to these elements. As illustrated in Fig. 2, the lower end 107 of this lever is located in a slot 108 formed in member 101, and the lever is pivoted intermediate its ends, as by means of a pin 109, to a pair of upstanding arms 110 and 110a formed integrally with the sleeve 103. The pivotal connection at 109 is such that the lever 106 may be oscillated to the left and right, as viewed in Fig. 2, and, during this operation, the lower end 107 of the lever will move the member 101 axially in a corresponding direction. However, if the lever 106 is moved at right angles to the aforementioned pivotal movement, the supporting arms 110 and 110a secured to the sleeve 103 will rotate the latter and, through the pin and slot connection 104, 105, will rotate member 101 in a corresponding direction.

Novel means are provided for suitably guiding the various movements of the lever 106 in order that the operator may suitably control the selection and establishment of the desired gear ratio. To this end, a plate or quadrant 111 is employed, the lower end 112 of which is adapted to receive one end of the sleeve 103. In order to limit the rotatable movement of the latter, the left-hand extremity thereof is provided with a slot 113 adapted to receive a pin 114 carried by the end 112 of the quadrant. The upper portion of the quadrant is suitably formed for guiding the various movements of the lever 106. As will be readily understood from Figs. 2 and 3, a transverse slot 115 permits oscillating movement of the lever about pivot 109 while slots 116, 117, 118 and 119 serve to guide the movements of the lever 106 which are effective to rotate the sleeve 103. In the particular arrangement illustrated, movement of the lever 106 into slot 116 is effective to operate the valve controlled by the actuating member 87 in order to establish first gear ratio. Movement of the lever 106 into slot 117 secures second gear relation, movement of the lever into slot 118 establishes third gear ratio, while reverse gear is secured by movement of lever 106 into slot 119. In the position of the parts illustrated, the actuating lever 106 is so located in the transverse slot 115 as to be capable of movement into either of the slots 117 or 118 to establish second or third gear relation. Pivotal movement of the lever to the left, as viewed in Fig. 2, will secure such movement of sleeve 103, member 101 and rod 88 as to select the valve for controlling first gear, while pivotal movement in the opposite direction will so position the above mentioned parts as to select the valve controlling reverse gear relation. In this connection, it will be observed that the action of the controlling lever 106 is somewhat similar to the method of operation of the usual manually-operable gear-shifting lever used in present-day automotive transmissions.

Any suitable mounting bracket, such as that shown at 120 in Fig. 1, may be employed for securing the quadrant 111 to the steering column 10. While, in Fig. 1, the valvular mechanism 14 has been shown in a location relatively closely adjacent the controlling lever 106, it will be understood that the member 101 may be of any length desired and that such an arrangement enables the valvular mechanism 14 to be mounted at a remote position with respect to the lever 106, such as, for example, on the steering column 10 beneath the floorboards of the vehicle.

As heretofore stated, the present invention utilizes an interlock between the selector and shifter motors of such a nature as to provide sequential operation thereof in the selection and shifting of the outside shift bars 15 and 17. This desirable result, it will be recalled, was secured by the utilization of the valve devices 46 and 47 which were actuated by movement of the selector piston and which controlled the flow of fluid pressure to the shifter motor. As an additional feature, the present invention includes an interlock between the selector and shifter motors which is so constituted as to positively prevent movement of the selector piston until the particular shift rod, with which the finger 22 is engaged, is returned to neutral position. To this end, and referring to Figs. 4 and 5, the finger 22 is so formed as to provide a pair of cams 121 and 122 which are located upon opposite sides of a depression 123. When the finger 22 is in its central or neutral position, the depression 123 receives a pin 124, Fig. 5. Pin 124 has formed thereon a reduced portion 125 for receiving the lower end of a detent 126, and, in the neutral position, it will be understood from Fig. 5 that the detent 126 may move downwardly in order to be freed from the notches 127, 128 or 129 positioned along the length of the piston rod 33. Thus, when fluid pressure is conducted to the selector motor, the piston 32 of the latter may be moved in the proper direction. A spring 130 is employed for normally urging the pin 124 into engagement with the finger 22. However, in the event that the finger 22 has been moved into selective engagement with any one of the shift rods 15, 16 or 17 and has been shifted with the selected rod through energization of the shifter motor, the pin 124 occupies the position illustrated in Fig. 5. Thus, detent 126 is cammed upwardly into engagement with any one of the notches 127, 128 or 129 in order to positively lock the piston rod 33 against movement in either direction until the finger 22 is returned to neutral position, whereupon the depression 123 is adapted to again receive pin 124 and thus enable the detent 126 to drop down into the reduced portion 125.

Referring to Fig. 9, the neutralizing mechanism 31 is preferably constituted by a spring 131 housed within a casing 132 formed as an extension of the transmission housing. Opposite ends of the spring are confined by cups 133 and 134, the former having flanged extensions 135 and 136 respectively abutting casing 132 and a washer 137 confined between a nut 138 and a sleeve 139 surrounding the outer end of piston rod 30. Cup 134 is likewise provided with flanged extensions 140 and 141 respectively abutting the casing 132 and a sleeve 142 carried by piston rod 30, such sleeve bearing against the central portion of the finger 22. In assembling the above described parts, the spring 131 is placed under initial compression and thus, through the cooperation between the cups 134 and 135 with washer 137 and sleeve 142, serves to constantly urge the piston rod 30 to its central neutral position.

In order to dampen any noise which may result from movement of the cups 133 and 134 in opposite directions during gear-shifting operations, lubricant within the casing containing finger 22 may be conducted into the casing 132 as by means of a duct 143. Thus, casing 132 may be maintained partially filled with lubricant, and any noisy operation of the neutralizing arrangement will be effectively dampened. A further dampening arrangement for reducing noise attendant upon reciprocation of the piston rod 30 is secured by the utilization of two pairs of dished washers 144 and 145 surrounding piston rod 30 and located upon either side of finger 22. Since the casing housing the finger 22 is adapted to contain lubricant, the spaces between these dished washers will likewise contain lubricant which, upon reciprocation of the piston rod 30, will be squeezed out when the washers are pressed between the stationary casing portions and the finger 22.

A suitable supply of lubricant is conducted to the piston 29 through a conduit 146, said lubricant being received in a chamber 147, Fig. 9, and conducted to the periphery of the piston through ducts 148, 149 and 150. Lubricant may also be conducted to the selector piston 32, Fig. 5, through a conduit 151, this arrangement serving to maintain the packing utilized in the piston in a proper condition.

From the foregoing description, it is believed that the operation of the invention will be readily apparent. It will be also understood that the mechanism herein described is preselective in its operation. For example, movement of the control lever 106 into any one of its four positions automatically causes a selecting and shifting operation of the fluid pressure-operated gear-shifting control mechanism. Hence, if the present invention is employed with a transmission of the type which may be only shifted from one position to another upon a reversal of torque occurring in the output shaft of the transmission, the various valves may be preset by movement of the lever 106 to a desired position and the gear relation will not be established until the subsequent reversal of torque has occurred.

While one embodiment of the present invention has been illustrated and described herein with considerable particularity, it will be understood that the same is not limited thereto but is capable of expression in a variety of forms, as well understood by those skilled in the art. For example, while the present apparatus has been described in connection with operation by fluid from a source of pressure, it is contemplated that a source of any fluid power, such as vacuum or oil, may be utilized. Various other changes and modifications will occur to those skilled in the art without departing from the spirit of the invention. Reference will therefore be had to the appended claims for a definition of the limits thereof.

What is claimed is:

1. In combination with a gear-shifting mechanism having a plurality of elements movable to establish different gear relations, a member operable in one direction to select one of said elements and movable in another direction to move said selected element, fluid pressure means to operate said member in said one direction, a fluid motor to operate said member in said other direction, and means for controlling the fluid pressure energization of said fluid pressure means and motor comprising manually-operable valve mechanism including a plurality of selectively operable valves, means connecting said valves to said fluid pressure means, means including a pair of valve devices operable by operation of said fluid pressure means to connect a portion of said valves and fluid motor, and means including said pair of valve devices for connecting said fluid motor and another portion of said valves when said fluid pressure means is deenergized.

2. In a control mechanism for a power-operated gear-shifting apparatus having a member movable to select and shiftable to establish a desired gear relation, a double-acting fluid motor including a pressure-responsive member for moving said member in opposite directions, manually-controlled valve means for selectively controlling the admission of fluid energy to either end of said motor to energize the latter, a second double-acting fluid motor for shifting said member, means including a pair of valve devices operable by movement of said pressure-responsive member in opposite directions for controlling the admission of fluid energy to said second motor, other manually-controlled valve means, and means connecting said second motor and said other valve means through the pair of valve devices when the first motor is deenergized.

3. In a control mechanism for a power-operated gear-shifting apparatus having a member movable to select and shiftable to establish a desired gear relation, a pair of double-acting fluid motors for respectively effecting selecting and shifting operations of said member, manually-controlled valve mechanism operable to a predetermined position corresponding to the gear relation desired, means to energize the selecting motor in either of opposite directions in accordance with operation of said mechanism to one or another position corresponding to a pair of gear relations desired, means including a pair of valve devices operated by movement of said selecting motor for energizing one end or the other of the shifting motor depending upon the position of the valve mechanism, and means operable upon movement of the valve mechanism to one or another position corresponding to a pair of different gear relations for connecting either end of said shifting motor to said valve mechanism through one or the other valve device.

4. In a control mechanism for a power-operated gear-shifting apparatus having a member movable to select and shiftable to establish a desired gear relation, a pair of double-acting fluid motors for respectively effecting selecting and shifting operations of said member, a source of fluid pressure, connections between said source and opposite ends of said motors, a valve in each of said connections, a rotatable valve-operating member common to all of said valves, means for mounting said last named member for axial movement in opposite directions from a normal central position, means carried by said valve-operating member for selectively operating said valves dependent upon the axial position of the valve-operating member and the direction of rotation thereof, a manually-operable lever for moving said valve-operating member axially and for rotating the same in opposite directions and valvular means interposed in said connections for controlling the flow of fluid pressure therethrough and operated by one of said fluid motors for selectively rendering said connections effective or ineffective to permit the flow of fluid pressure from said valves to said fluid motor through said valvular means and connections.

5. In combination with a gear-shifting mechanism having a plurality of elements movable to establish different gear relations, a member operable in one direction to select one of said elements and movable in another direction to move said selected element, fluid pressure means to operate said member in said one direction, a fluid motor to operate said member in said other direction, and means for controlling the fluid pressure energization of said fluid pressure means and motor comprising a plurality of valves, means connecting certain of said valves to said fluid pressure means, means including a pair of valve devices operable by operation of said fluid pressure means to connect said certain valves and fluid motor, means connecting the remainder of said plurality of valves to said fluid motor through said pair of valve devices when the fluid pressure means is deenergized, and means for selectively operating said plurality of valves.

6. In combination with a gear-shifting mechanism having a plurality of shift bars movable in opposite directions to establish desired gear relations, of a power-operated control mechanism therefor comprising a member movable to select one of said bars and shiftable with said selected bar, fluid-operated means for moving said member in opposite directions, a fluid motor for shifting said member in opposite directions, means including a pair of valves for controlling the energization of said fluid-operated means to effect movement thereof in opposite directions, means including a second pair of valves for controlling the energization of said fluid motor, means including a third pair of valves operated by movement of said fluid-operated means in opposite directions for controlling the energization of said fluid motor on operation of said first two pairs of valves, and means for selectively operating said first and second pairs of valves comprising a rotatable member, a plurality of cams carried thereby, one for each valve of said first and second pair and positioned to operate the associated valve upon rotation of said rotatable member in opposite directions.

7. In combination with a gear-shifting mechanism having a plurality of shift bars movable in opposite directions to establish desired gear relations, of a power-operated control mechanism therefor comprising a member movable to select one of said bars and shiftable with said selected bar, power means including an element actuated thereby for moving said member in opposite directions, other power means for shifting said member in opposite directions, and means actuated by said member for engaging said element during shifting movement in either direction from a central position for locking the first power means and element against operation.

8. In combination with a gear-shifting mechanism having a plurality of shift bars movable in opposite directions to establish desired gear relations, of a power-operated control mechanism therefor comprising a member movable to select one of said bars and shiftable with said selected bar, a fluid motor including an element operatively connected with said member for moving the latter into selective engagement with a desired shift bar, a second fluid motor having a connection with said member for shifting the latter and shift bar engaged thereby in either of opposite directions to effect the desired gear relation, and means actuated by shifting movement of said member for engaging and positively preventing operation of said first fluid motor and element except when said member is in a central, neutral position.

9. In a control mechanism for a power-operated gear-shifting apparatus having an element movable in opposite directions in different planes for establishing a desired gear relation, a pair of fluid motors for respectively controlling the movements of said element in said different planes, a plurality of valves for controlling the fluid pressure energization of said motor, means for operating said valves comprising a rotatable and slidable member, a manually-operable lever movable in two planes at right angles, means connecting said lever and member for slidably moving the latter to select a desired valve during movement of the lever in one plane, and means connecting said lever and member for rotating the latter to operate the selected valve during movement of the lever in the other plane and valvular means controlled by the operation of one of said fluid motors for controlling the flow of fluid pressure from said plurality of valves to said other motor.

ROY S. SANFORD.
WILLIAM J. ANDRES.
FREDERICK F. ROHRER, Jr.